May 5, 1959    H. M. ROLLINS    2,885,225
DRILL PIPE COUPLING HAVING PARTICULAR THREAD FORMATIONS
Filed Feb. 17, 1955
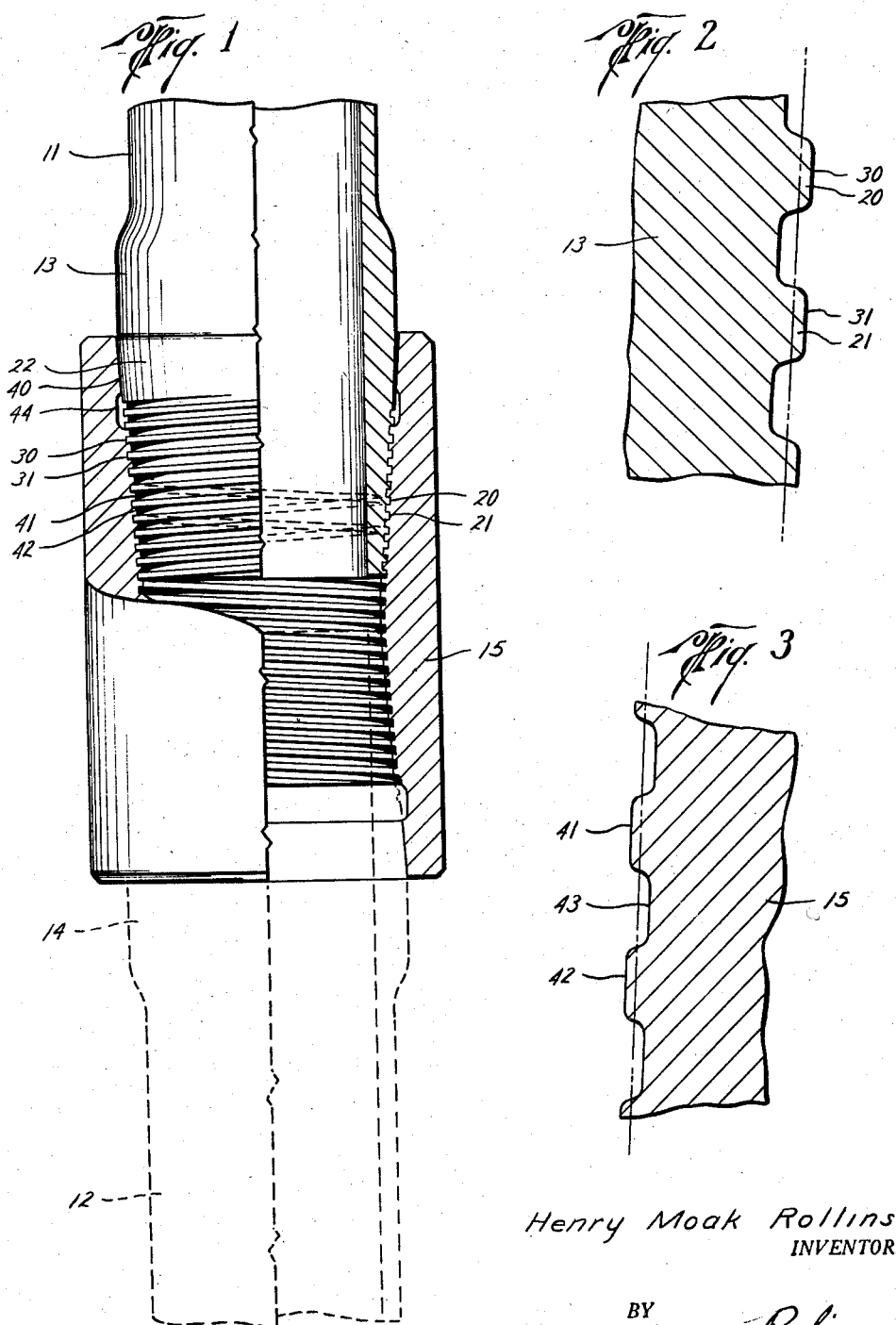
Henry Moak Rollins
INVENTOR.
BY Murray Robinson
ATTORNEY United States Patent Office 2,885,225
Patented May 5, 1959

2,885,225

DRILL PIPE COUPLING HAVING PARTICULAR THREAD FORMATIONS

Henry Moak Rollins, Midland, Tex., assignor to Drilco Oil Tools, Inc., a corporation of Texas Application February 17, 1955, Serial No. 488,797

4 Claims. (Cl. 285—115)

This invention pertains to drill pipe connections.

The object of the invention is to provide a connection between a drill pipe and a pipe coupling that will combine the most desirable features of the usual tool joint to tool joint connection with those of the earlier drill pipe to coupling connection as well as providing certain advantages of its own not found in either of these two previously known types of connections.

A connection according to the invention will combine the advantages of quick and easy make-up, no overtravel or creepage, easy stabbing, long thread life, good sealing on low torque without permanent deformation, resistance to uncoupling on reverse torque, lightweight permitting use of smaller drill rigs for a given depth or drilling to deeper depths with a given rig, larger pipe diameter for a given coupling diameter which permits easier flow of drilling fluid through the inside of the drill pipe and higher velocity flow in the annulus between pipe and hole wall for better removal of cuttings.

A further advantage of a connection according to the invention lies in the fact that it makes possible a complete revolution in drill pipe practice whereby lighter gage and/or larger diameter pipe can be used for drilling which can also be used for tubing, casing, or line pipe after its useful life as drill pipe has expired, compared to present practice calling for heavy gage smaller diameter drill pipe which must be used to failure because of lack of utility of the pipe for other purposes.

In effecting the desired combination, a number of features such as taper, thread height, threads per unit length, and number of threads become quite critical, as will be pointed out in the following description, departure from the specifications thereof resulting in wholly unsuitable connections.

For a description of a preferred embodiment of the invention reference will now be made to the accompanying scale drawings wherein:

Figure 1 is a side elevation, partly in section, showing a connection embodying the invention, and Figures 2 and 3 are sections to a larger scale showing the profiles of the pin and box threads.

I. *Thread taper*

Referring now to Figure 1, there is shown a connection comprising the ends of pipes 11 and 12 which may be upset either internally (as shown), or externally or both internally and externally at 13 and 14, and a generally tubular connector 15 which may be cylindrical on its exterior (as shown) or may have one or more flat surfaces thereon. The ends of the pipe are tapered approximately 1½ inches per foot measured on the diameter. This taper represents an optimum condition with regard to stabbing the connection together, and with regard to ease of make up. A greater taper (in excess of 2 inches per foot) will produce a very short thread length on this relatively thin wall pipe material which length will be insufficient to prevent wobbling and plastic deformation of the connection. In this regard it should be noted that there is a practical limit on the amount of upset that can be achieved on the end of a pipe and that this limit is directly related to the initial wall thickness of the pipe.

A smaller taper (less than 1 inch per foot) will produce excessive wedging action in stabbing the connection together and in make up, the connector having insufficient mechanical advantage to resist "creeping" during use, i.e. further make-up of the pipe and connector ultimately resulting in bursting of the connector or crushing of the pipe. A friction coefficient of .06 to .09 is commonly used for calculations of friction of steel to steel surfaces lubricated with grease of the nature used in tool joints. With such a coefficient of friction, a conical wedge of ¾ inch per foot taper requires a tangential force to produce rotation 2 to 3 times as great as the axial load on the wedge; for such a wedge of 1½ inches per foot taper the tangential force is approximately equal to the axial load. This illustrates the difficulty to be encountered in make up of joints with tapers of less than 1 inch per foot and the relative ease of make up of joints with greater taper. For these reasons 1 inch per foot is considered a minimum taper and 2 inches per foot as maximum taper for this particular construction, with 1½ inches per foot considered an optimum condition.

The pipe ends 13 and 14 are the same so only end 13 will be described further. Likewise the two ends of connector 15 are the same so only the end in engagement with pipe end 13 will be described further. Pipe end 13 will be described first. In connection therewith it should be borne in mind that the connector is substantially correlative thereto. The description of the connector will consist largely in pointing out those places wherein it is not correlative to the pipe end.

II. *Thread multiplicity and frequency*

A double thread 20, 21 in which the lead is twice the pitch with a thread frequency of three to five and preferably four threads per inch, counting each thread crest in an axial plane, is formed integrally on the continuously tapered portion at the end of the pipe, terminating short of the end of the tapered portion, so as to leave a smooth conical land 22. Generally speaking a single thread would give too much mechanical advantage and could cause permanent deformation at relatively low torque resulting in additional make-up or creep during drilling operations. A triple or greater multiple thread would give too little mechanical advantage so that the connection would be subject to coming apart on low reverse torque. Too many threads per inch would result in small easily damaged threads and too few threads per inch would result in difficulty in thread engagement for make-up; but it must be remembered that the factors of thread multiplicity and thread frequency are not independent and influence all of the factors referred to. The specified combination of double thread with three to five threads per inch produces a strong thread, easily made up, with resistance to creep and to loosening which also has the advantage of rapid make up, in that a double thread will make up twice as fast as a single thread.

III. *Thread height*

Speed of make-up is also dependent on the thread height, i.e., distance from crest to root measured perpendicular to the conical surface on which the thread is formed. Thread height is most easily specified generically for thread profiles having straight flanks by reference to the width of the thread at the base. On this basis, a thread having a square profile would have unit thread height and a standard, 60 degree V thread would have a thread height equal to the sine of 60 degrees or .86 unit. To care for the case of thread profiles having flanks that are wholly or in part curved, the definition may be revised to substitute for the width at the base a quantity equal to the intercept on the root cone of tangents to the thread flanks midway between crest and root, midway meaning at half the thread height. To achieve the desired quick make-up the thread height should not be more than 0.5 unit. The ultimate lower limit on thread height depends on the shear strength of the thread material and on the requirement that there continue to be adequate engagement after wear, and a lower limit would be 0.25. The preferred uniform thread height is 0.375 giving together with the preferred taper, thread multiplicity and thread frequency a make up in 1.6 turns.

IV. Thread crests

As best shown in Figure 2, the threads 20 and 21 have steeply sloping flanks and flat crests 30, 31. One important advantage of flat crested threads is that they are less apt to be sheared off during stabbing operations than are sharp crested threads.

For reasons to be pointed out later herein, the pipe threads are preferably slightly higher than the connector threads so that only the pipe thread crests engage their opposing inter-thread-root spaces. The flat pipe thread crests, being on the same cone as land 22, provide continuous engagement with the connector 15 along the whole length of the interengaged portion.

It is primarily the engagement of the flat pipe thread crests and the pipe land 22 with the correlative parts of the connector that limits the make-up of the connection. By means of flat crested threads, an adequate thread engagement area is provided without the necessity of deep cut threads.

Low thread height combines with the specified thread taper in achieving an adequate length of thread on thin walled pipe, the necessity for which thread length was previously mentioned in discussing thread taper. The advantage of low thread height combined with the specified thread taper, frequency, and multiplicity in producing quick make up has already been referred to in discussing thread height. All these advantages stem in part from the use of flat crested threads.

From the foregoing it will be apparent that flat crested threads are an important element of the invention which makes possible the provision on light gage pipe of a thread satisfactory for the repeated rapid makes and breaks and other requirements of a drill string.

V. Thread flank angle

The thread flanks function to transmit force between pipe and connector and act as in a screw jack in drawing the pipe and connector together during make up. The slope of the thread flanks can be varied over a considerable range and still meet the requirements of these functions. Therefore, no range of preferred flank angle has been given. It is to be noted however that within the thread height range specified according to the invention, the thread flanks are preferably steeply sloping in order to provide a large area of flat thread crest. The smaller the flank angle the larger the thread crest area for any given thread height. A considerable thread crest area will reduce the unit stress thereon and thus avoid plastic deformation. This is a particularly important consideration in the preferred form of the invention wherein only the pipe thread crests are engaged when the connection is made up. On the other hand some degree of flank angle greater than zero is preferable in order to facilitate stabbing and make up.

In the preferred thread form shown in Figure 2, wherein the thread height is 0.375, the flank angle is about 14½ degrees. This provides a thread crest area that is about 90% of the area of the thread base. With a thread of 0.5, the upper limit herein specified, a flank angle of less than 45 degrees is necessary in order to produce any flat crest area at all on a thread having a symmetrical profile, and to produce a crest area 90% of the base area on 11 degree flank angle would be required. With a thread height of 0.25, the lower limit herein specified, a flank angle of less than about 62½ degrees is required to produce any flat thread crest area at all, and to produce a crest area 90% of the base area a flank angle of about 21 degrees would be required.

VI. Thread crest taper

The thread crest taper angle is the same as that of the lands. Therefore, if both are held to the same tolerances, there will be proper engagement of both threads and lands when the connection is made up. If the thread crests were on a different taper angle, there would be likelihood of the threads engaging to such an extent prior to the lands that there would be no seal, or the threads might engage so much later than the lands as to impose bursting strains on the portion of the connector around the lands when the threads finally are fully engaged.

VII. Connector

The connector 15 is tapered and threaded on its interior correlative to the taper and thread on the end of the pipe, except that preferably the smooth portion or land 40 at the mouth of the connector is not precisely on the same cone as the roots of the double threads 41, 42, being slightly (about .005 inch) inside the root cone of threads 41, 42 so as to engage elastically with land 22 before the flat crests 30, 31 of threads 21, 22 engage the inter-thread root areas 43 of the connector so as to assure a seal between the smooth lands 22 and 40. Lands 22 and 40 preferably have an axial extent equal to that of about four threads or one inch with the preferred thread frequency.

The threads of the connector 15, shown best in Figure 3, although substantially congruent to the pipe threads, are made of slightly less height (about .010 inch) than the threads of the pipe so that the engagement will be uniformly along the cone of the pipe thread crests and land. This type threading insures against interference of the connector thread crest and pipe thread inter-root areas, thereby preventing the threads from sealing. If the thread and land both seal, lubricant trapped between the land and first thread has no means of escape and as the joint makes up, the grease is compressed as the space becomes smaller. This entrapped grease provides exceptional lubrication and permits excessive make up at low torque, producing permanent deformation of the connector. The connector is provided with an undercut or groove 44 adjacent land 40 to eliminate any incomplete threads on the connector and to provide clearance for the thread run out on the pipe. This insures that there can be sufficient make-up to provide a good seal between the lands.

In use, a connector may initially be applied to one end of each pipe and the pipes then treated as though having a permanent socket on one end adapted to be made up when desired with the pin end of another pipe, the connector being disconnected always at the same ends that were last connected. Then when the threads become worn at those ends, the connectors can be broken loose at the other ends and the string of pipe used longer until the threads at that end become worn. Finally the pipe may be abandoned as drill pipe and permanently made up as well casing or tubing or line pipe.

It is to be noted that the connector has no internal stops to limit the inward motion of the pipe as is customary to prevent creeping. Due to the steep taper of the connection, great axial force is required to move the pipe into the connector after the connection is fully made up, and due to the large thread lead resulting from the coarse double thread the axial force on the pipe created by the torque thereon during drilling is low, so that creepage is resisted without any internal stops in the connector.

The elimination of such stops insures that the connection can be made up sufficiently to cause the lands to seal in all cases, regardless of tolerancies in manufacture and wear in use.

While a preferred embodiment of the invention has been shown and described, some variations can be made within the specified limits and other changes can be made by one skilled in the art without departing from the spirit of the invention and it is desired to secure by letters patent all forms of the invention falling within the scope of the following claims.

I claim:

1. A steel connection comprising a pipe and a steel tubular connector, the outer surface of said pipe at one end thereof and the inner surface of said connector at one end thereof being correlatively continuously tapered not less than one inch per foot nor more than two inches per foot measured on the diameter, said surfaces being provided with correlative congruent flat crested integral double threads having a thread frequency between three and five threads per inch and a thread height between 0.25 and 0.50 unit expressed as a ratio of height to base width, the height of the threads on each of said surfaces of the pipe end and connector being uniform, the crests of the threads on one of said surfaces being higher than those on the other of said surfaces to engage the inter-thread-root space on said other surface without engagement of the crests of the threads on the other of said surfaces, said threads terminating at a point spaced inwardly from the end of the connector and correlatively on the pipe to leave smooth tapered lands on said surfaces for sealing engagement, said pipe land being integral with said pipe and being formed substantially on the same cone as the pipe thread crests and said connector land being integral with said connector and being formed substantially on the connector thread root cone and the connector being clear of internal obstructions to the movement of the pipe into the connector at the point of initial engagement of said lands, whereby full engagement of said flat thread-crests as required to resist creepage and full engagement of said lands as required to provide sealing are both achieved at the same time.

2. A pipe assembly comprising a light gage steel pipe having like externally continuously tapered ends and a steel tubular connector connected to one end of the pipe, the connector having like internally tapered ends correlative to the pipe end tapers, said taper being between one and two inches per foot, said tapered ends of said pipe and connector being provided with correlative congruent flat crested integral double threads having steeply sloping flanks and having a frequency between three and five threads per inch, said pipe ends having smooth conical sealing surfaces between the threaded portions thereof and the adjacent center portions of the pipe formed on substantially the same conical surface as the crests of the threads at the corresponding end, said connector ends having smooth conical sealing surfaces nearer the extremities thereof than the threaded portions thereof and formed on substantially the same cones as the thread root cones of the corresponding connector ends, said sealing surfaces being integral with said pipe and connector respectively the height of the threads of the pipe ends and connector ends being uniform and within the range 0.25 to 0.50, the thread height, frequency, and multiplicity being such as to cause the pipe assembly to make up and seal with a like assembly in two or less turns, the height of the threads on the pipe being greater than the height of the threads on the connector to prevent trapping of any joint compound or the like therebetween during make-up and thus avoid overmake, all of the material of said connector being disposed outside of the surface defined by the connector clear of obstructions so that the pipe is free to move inwardly during make-up until said lands are in sealing engagement, further make-up during use being resisted by the high mechanical advantage of the connector due to its steep taper and the low mechanical advantage of the pipe due to its large thread lead, the like taper of said pipe thread crests and pipe land insuring both sealing of the pipe land with the connector land and engagement of the pipe thread crest with the connector inter-root space when the connection is made up fully.

3. A pipe connector comprising a steel tubular body having continuously outwardly flaring conical openings at its ends, the taper of said openings being in the range of one to two inches per foot measured on the diameter, said openings being each provided with integral flat topped double threads having a thread frequency of four threads per inch and a uniform thread height less than 0.5 unit relative to the thread base width, said openings each being provided with a smooth conical area near the extremity thereof beyond the threads, said smooth areas being integral with said body the cones of said smooth area being substantially coincident with the cones of the roots of the adjacent threads, the minimum internal diameter of said connector being no less than the diameter of the thread crest cones at their juncture at the center of the connector.

4. A steel pipe having upset externally continuously tapered ends, the taper being not less than one inch per foot nor more than two inches per foot, measured on the diameter, said ends each being provided with integral flat topped double threads having a thread frequency between 3 and 5 threads per inch, the thread height being uniform and between 0.3 and 0.5 unit relative to the thread base width, and each end being provided with a tapered seal area adjacent the threads and nearer the middle part of the pipe than the threads, the seal areas being integral with said pipe and on the same cones as the crests of the adjacent threads, the thread height, taper, multiplicity, and frequency being such as to facilitate quick make-up with a correlative threaded member and thereafter to resist creepage.

References Cited in the file of this patent

UNITED STATES PATENTS

| | | |
|---|---|---|
| 1,407,335 | Reynolds | Feb. 21, 1922 |
| 1,932,427 | Stone | Oct. 31, 1933 |
| 2,122,757 | Scott | July 5, 1938 |
| 2,267,923 | Johnson | Dec. 30, 1941 |
| 2,341,670 | Stinson | Feb. 15, 1944 |
| 2,380,690 | Graham | July 31, 1945 |
| 2,437,638 | Evans | Mar. 9, 1948 |
| 2,669,469 | Finch | Feb. 16, 1954 |
| 2,671,949 | Welton | Mar. 16, 1954 |

FOREIGN PATENTS

| | | |
|---|---|---|
| 460,381 | Germany | May 25, 1928 |
| 678,613 | Great Britain | Sept. 3, 1952 |